(12) United States Patent
Imai

(10) Patent No.: US 8,144,654 B2
(45) Date of Patent: Mar. 27, 2012

(54) COMMUNICATION DEVICE PERFORMING COMMUNICATION ACCORDING TO TWO COMMUNICATION METHODS

(75) Inventor: Masaaki Imai, Kasugai (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1124 days.

(21) Appl. No.: 12/005,385

(22) Filed: Dec. 27, 2007

(65) Prior Publication Data

US 2008/0161025 A1 Jul. 3, 2008

(30) Foreign Application Priority Data

Dec. 28, 2006 (JP) ................................. 2006-354022

(51) Int. Cl.
 *H04W 4/00* (2009.01)
(52) U.S. Cl. ........ 370/329; 370/319; 375/132; 375/135; 375/136; 375/303; 375/334; 455/454; 455/447; 455/450
(58) Field of Classification Search ........................ None
 See application file for complete search history.

(56) References Cited

U.S. PATENT DOCUMENTS

| | | | | | |
|---|---|---|---|---|---|
| 4,712,229 | A | * | 12/1987 | Nakamura | 455/465 |
| 5,668,837 | A | * | 9/1997 | Dent | 375/316 |
| 6,047,175 | A | * | 4/2000 | Trompower | 455/452.1 |
| 6,389,059 | B1 | * | 5/2002 | Smith et al. | 375/141 |
| 7,251,499 | B2 | * | 7/2007 | Ella et al. | 455/552.1 |
| 7,324,475 | B2 | * | 1/2008 | Sato et al. | 370/329 |
| 7,769,073 | B2 | * | 8/2010 | Yarkosky | 375/130 |
| 2001/0055954 | A1 | * | 12/2001 | Cheng | 455/74.1 |
| 2002/0012381 | A1 | * | 1/2002 | Mattisson et al. | 375/132 |
| 2002/0052201 | A1 | * | 5/2002 | Wilhelmsson et al. | 455/434 |
| 2003/0219002 | A1 | | 11/2003 | Kishida | |
| 2004/0047306 | A1 | * | 3/2004 | Katagishi et al. | 370/320 |
| 2004/0132485 | A1 | * | 7/2004 | Charney et al. | 455/552.1 |
| 2004/0147243 | A1 | * | 7/2004 | McKenna | 455/403 |
| 2006/0057987 | A1 | * | 3/2006 | Nail et al. | 455/168.1 |
| 2006/0148482 | A1 | * | 7/2006 | Mangold | 455/450 |
| 2007/0258417 | A1 | * | 11/2007 | Harvey et al. | 370/338 |
| 2007/0280155 | A1 | * | 12/2007 | Le et al. | 370/328 |
| 2008/0062919 | A1 | * | 3/2008 | Chen et al. | 370/329 |
| 2008/0076463 | A1 | * | 3/2008 | Bednekoff et al. | 455/522 |
| 2008/0171525 | A1 | * | 7/2008 | Kato | 455/205 |
| 2008/0186938 | A1 | * | 8/2008 | Okazaki | 370/343 |

FOREIGN PATENT DOCUMENTS

JP A-2003-249973 9/2003

* cited by examiner

*Primary Examiner* — Ian N Moore
*Assistant Examiner* — Dung B Huynh
(74) *Attorney, Agent, or Firm* — Oliff & Berridge, PLC

(57) ABSTRACT

A communication device includes a CPU, a wireless LAN communication controller, and a digital cordless communication controller. The wireless LAN communication controller is capable of communicating wirelessly with the access point according to a data communication method. The digital cordless communication controller is also capable of communicating wirelessly with the handset according to a voice communication method. The CPU sets a first frequency band used for wireless communications by the wireless LAN communication controller. The CPU sets a second frequency band used for wireless communications by the digital cordless communication controller. When another communication device interferes with wireless communications between the communication device and the handset, the communication device changes this interference from the other communication device to interference received from wireless communications with the access point by shifting the second frequency band to the first frequency band.

10 Claims, 6 Drawing Sheets

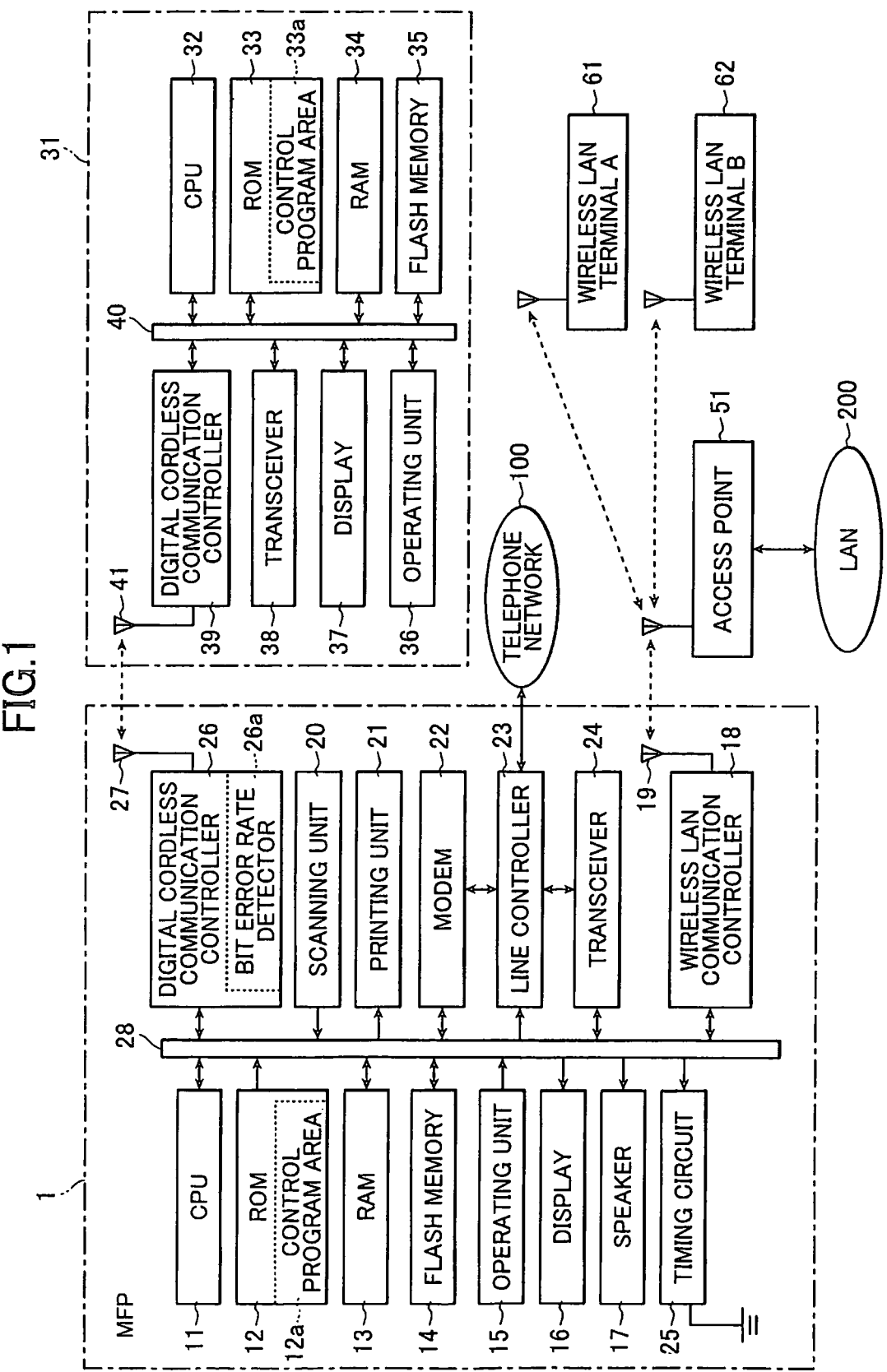

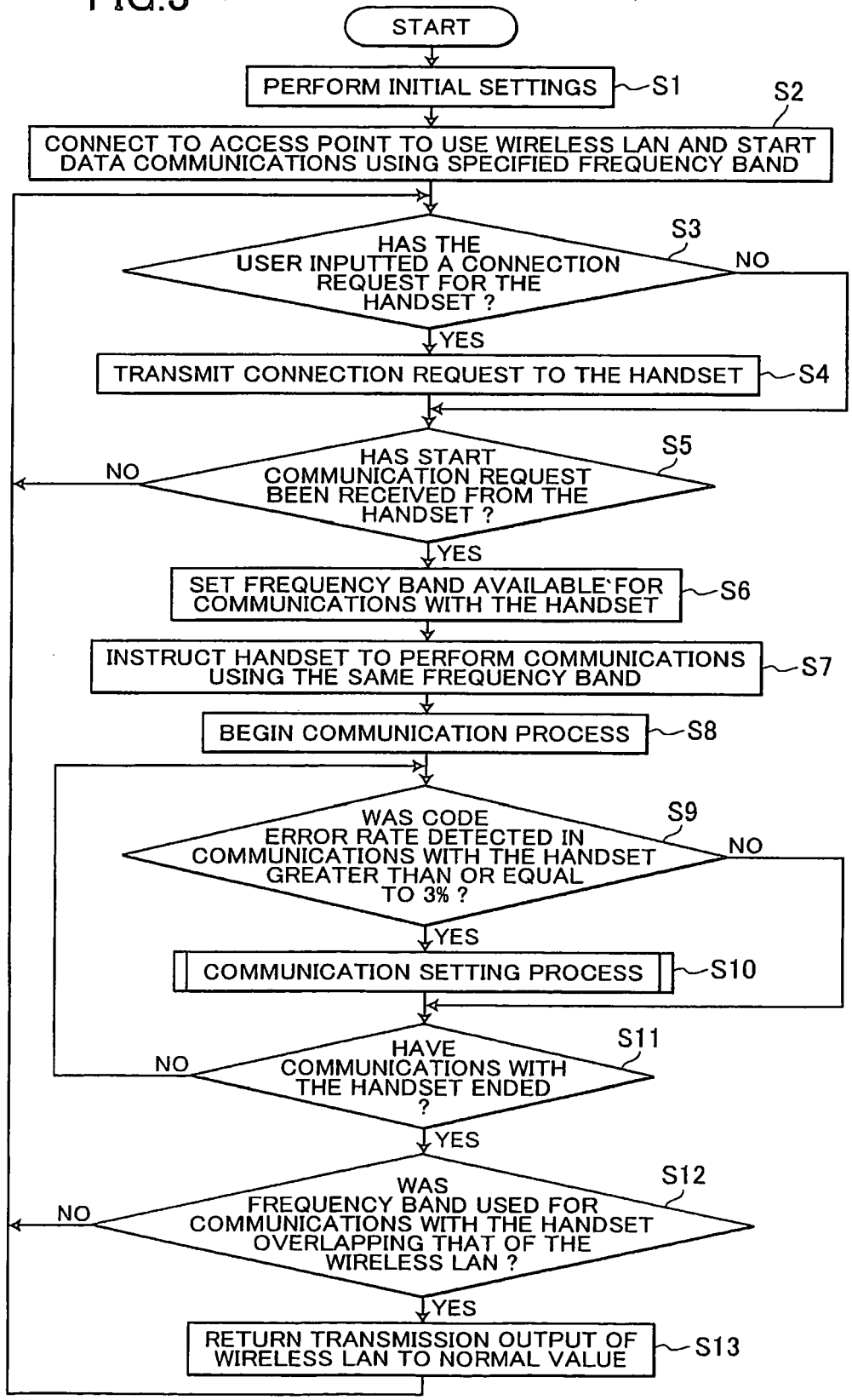

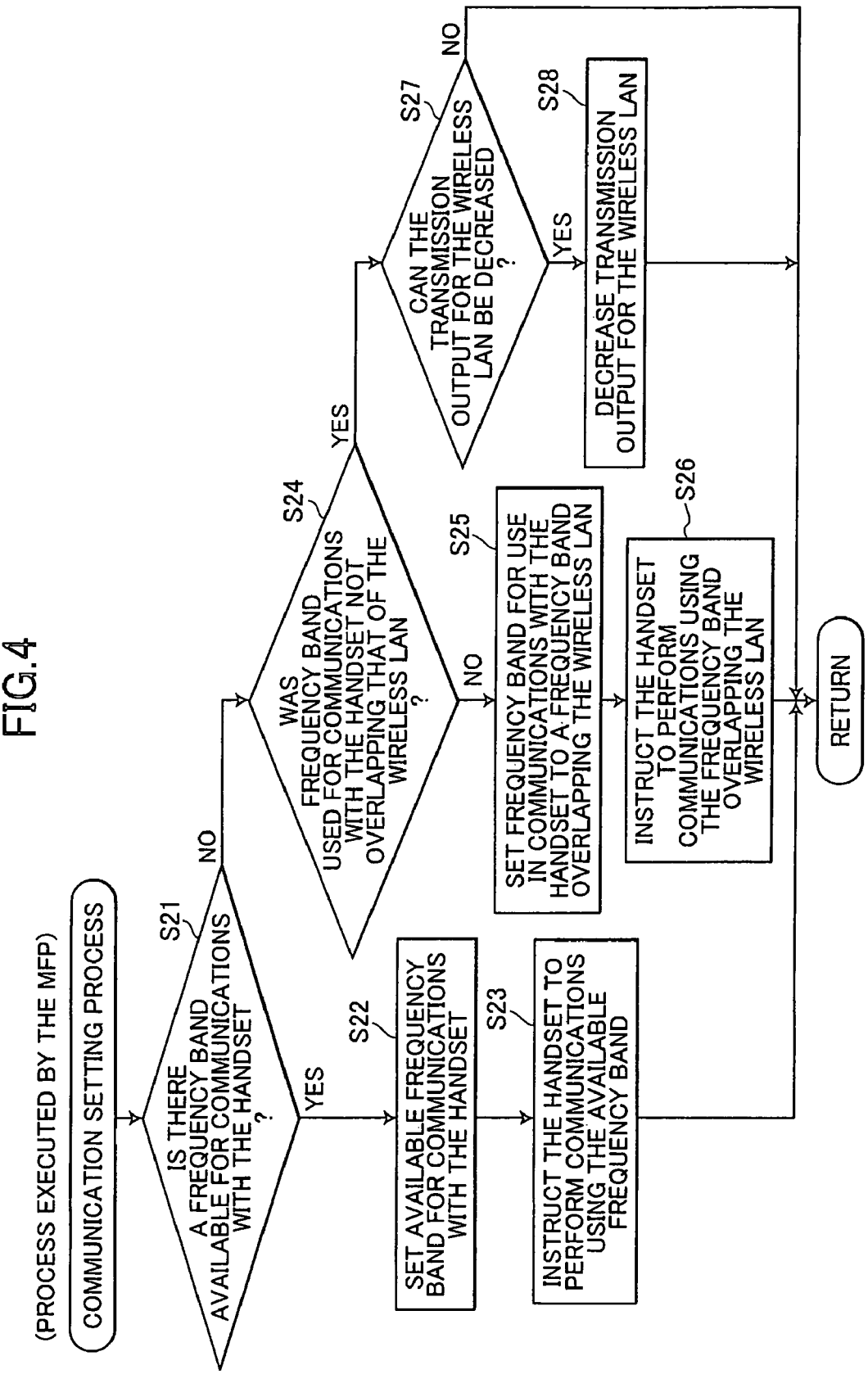

(PROCESS EXECUTED BY THE HANDSET)

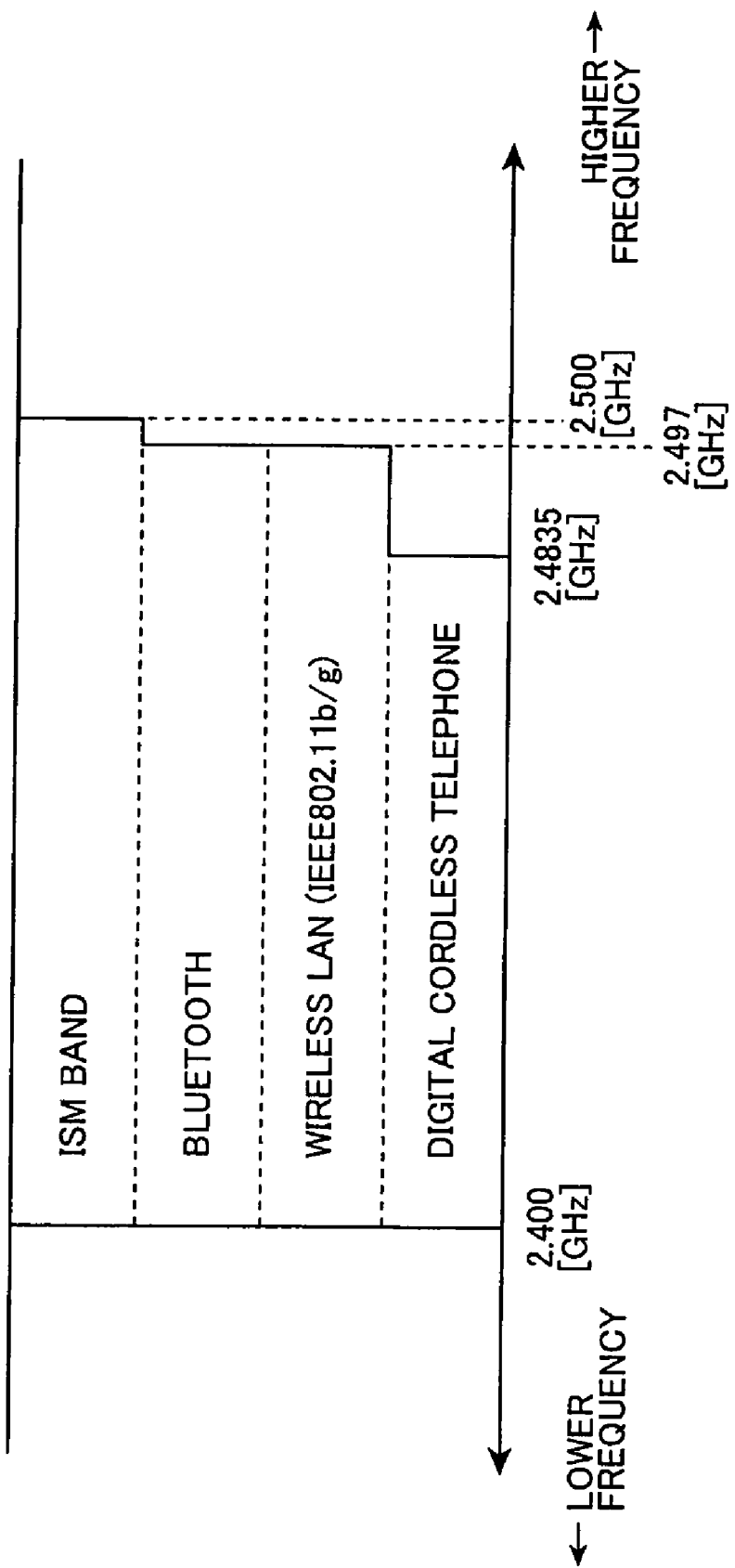

COMMUNICATION DEVICE PERFORMING COMMUNICATION ACCORDING TO TWO COMMUNICATION METHODS

CROSS REFERENCE TO RELATED APPLICATION

This application claims priority from Japanese Patent Application No. 2006-354022 filed Dec. 28, 2006. The entire content of its priority applications is incorporated herein by reference.

TECHNICAL FIELD

The present invention relates to a communication device capable of wireless communications according to a plurality of methods.

BACKGROUND

Communication devices capable of implementing data communications and telephone calls wirelessly are well known in the art. In some cases, the frequency bands used for wireless communications by these communication devices overlap, even when the communication devices use different communication methods. When the frequency bands used for wireless communications by the communication devices overlap, the wireless communications of these devices interfere with each other, preventing the devices from achieving reliable wireless communications.

Generally, the frequency band appropriated for wireless communications is determined based on the communication method, while channels are designated based on differences in the center frequency of the frequency bands. However, the width of the appropriated frequency band varies according to the communication method, even when the channel number is the same. For simplification, the frequency bands used in wireless communications will be specified in the following description.

FIG. 6 outlines some common wireless communications standards for wireless LANs and digital cordless telephones that use the same frequency band. As shown in FIG. 6, the frequency band between 2.4 and 2.5 GHz is called the ISM (Industrial, Scientific, and Medical) band employed by industrial, scientific, and medical equipment that use radio waves for purposes other than communications.

For example, the ISM band is used for such medical equipment as laser scalpels, telecontrol devices and the like in factories, and cooking appliances such as microwaves. The frequency band from 2.4 to 2.497 GHz is used for the Bluetooth wireless communications protocol based on IEEE 802.15.1. The frequency band from 2.4 to 2.497 GHz is used in the wireless LAN standard based on IEEE 802.11b/g and is primarily employed in notebook computers. The frequency band from 2.4 to 2.4835 GHz is used in digital cordless telephones to implement wireless communications between like handsets and between the handsets and a base unit.

Since various devices perform wireless communications using the same frequency band in this way, there is always a chance that the wireless communications will interfere with each other.

To resolve this problem, Japanese unexamined patent application publication No. 2003-249973 discloses a communication controller that detects data for wireless channels used by each communication device and wireless channels that pose difficulties due to noise and the like in order to avoid the overlapping of frequency bands used in wireless communications by the communication devices. The communication controller periodically notifies each communication device of the data detected for the wireless channels. Based on this data, the communication devices select a wireless channel having a frequency band not currently used for wireless communications.

However, when the number of communication devices is large, the frequency band used by a communication device inevitably overlaps that used by another communication device, resulting in interference that prevents the communication devices from performing proper wireless communications.

SUMMARY

The above and other objects will be attained by a communication device that includes a first communicating unit, a second communicating unit, a first setting unit, a second setting unit, a selector, and a control unit. The communication device communicates with a first communication device and a second communication device. The first communicating unit is capable of communicating wirelessly with the first communication device according to a first communication method. The second communicating unit is capable of communicating wirelessly with the second communication device according to a second communication method. The first setting unit sets a first frequency band used for wireless communications by the first communicating unit. The second setting unit sets a second frequency band used for wireless communications by the second communicating unit. The selector selects whether to shift the second frequency band. The control unit controls the second setting unit to set the second frequency band so as to overlap the first central frequency with the second central frequency when the selector selects to shift the second frequency band.

With the communication device, when another communication device interferes with wireless communications between the communication device and the second communication device, the communication device changes this interference from the other communication device to interference received from wireless communications with the control unit by shifting the frequency band used for wireless communications with the second communication device to the first frequency band used in wireless communications with the first communication device. The communication device can prevent wireless communications with the control unit from interfering with communications with the second communication device by controlling the second setting unit.

BRIEF DESCRIPTION OF THE DRAWINGS

The particular features and advantages of the invention as well as other objects will become apparent from the following description taken in connection with the accompanying drawings, in which:

FIG. 1 is a block diagram showing an electrical structure of a multifunction peripheral (MFP) and a handset having a communication device according to the preferred embodiment of the present invention, and an access point;

FIG. 3 is a flowchart illustrating steps in a main communication process performed by the MFP;

FIG. 4 is a flowchart illustrating steps in a communication setting process performed by the MFP;

FIG. 6 is an explanatory diagram conceptually illustrating frequency bands used by a wireless LAN and digital cordless telephone and common standards for wireless communications using the same frequency bands.

DETAILED DESCRIPTION

Figure 2A:
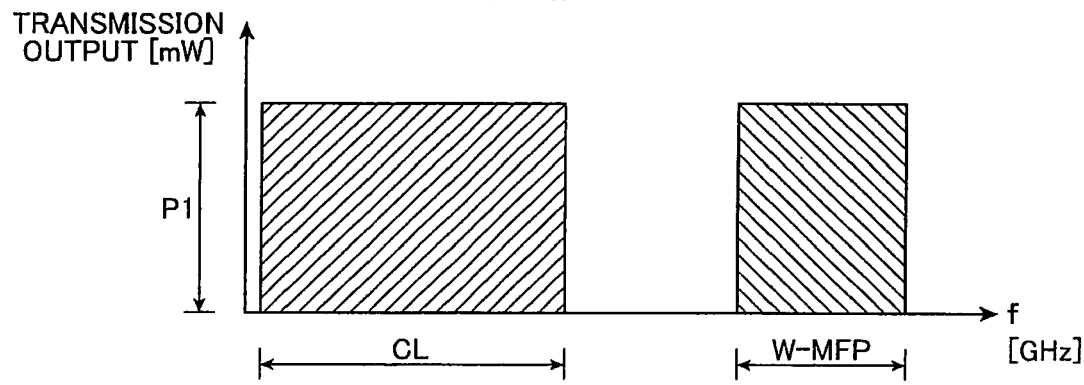
FIG. 2 is an explanatory diagram conceptually illustrating the states of wireless communications.

FIG. 1 is a block diagram showing the electrical structure of a multifunction peripheral (hereinafter abbreviated as MFP) 1 having a communication device according to the preferred embodiment, a handset 31, an access point 51, and the like. The MFP 1 possesses various functions, such as a communication function, a facsimile function, a printer function, a scanner function, and a copier function. In the preferred embodiment, the MFP 1 serves as the base unit for a digital cordless telephone that communicates primarily with external devices and the handset 31. The MFP 1 also functions as a communication device capable of performing wireless data communications with the access point 51. The handset 31 functions to perform wireless voice communications with the MFP 1, functioning as the base unit, and to perform voice communications with external devices through the MFP 1.

The MFP 1 includes primarily a CPU 11, a ROM 12, a RAM 13, a flash memory 14, a operating unit 15, a display 16, a speaker 17, a wireless LAN communication controller 18 including a wireless LAN antenna 19, a scanning device 20, a printing device 21, a modem 22, a line controller 23, a transceiver 24, a timing circuit 25, and digital cordless communication controller 26. These are connected each other via a bus line 28.

The CPU 11 is a processor that executes various programs stored in the ROM 12, the RAM 13, and the flash memory 14 and various signal sent or received via the wireless LAN communication controller 18, the line controller 23, and the digital cordless communication controller 26. The CPU 11 controls the overall operation of the MFP 1.

The ROM 12 includes a control program area 12a that stores various control programs executed by the CPU 11. The ROM 12 is a memory that stores a program of a main process and a program of a communication setting process described later. The RAM 13 is a nonvolatile memory that temporarily stores various data and like required in various processes executed by the CPU 11.

The flash memory 14 is nonvolatile memory that can be written thereto and read therefrom when the power to the MFP 1 is cut off. The operating unit is configured of a plurality of operating keys. The user can input instructions in the MFP 1 by manipulating the keys. The display is a liquid crystal screen displaying various data, menu corresponding to the operating keys and operation state of MFP 1. By operating the keys on the operating unit 15, the user can check various data, for example, a communication state between the MFP 1 and the access point 51, and a communication state between the MFP 1 and the handset 31.

The speaker 17 provides notifications to the user in the form of input tones produced when input keys on the operating unit 15 are operated, a warning tone produced when an error occurs, and a ringtone signifying an incoming call. The wireless LAN communication controller 18 includes the wireless LAN antenna 19 for connecting wirelessly with the access point 51 and for connecting to a LAN 200 through the access point 51. The MFP 1 can perform data communications with an external device connected to the LAN 200.

The scanning unit 20 reads an image from an original set at a prescribed scanning position (not shown) and generates an image data based on the image from the original. The data is printed on the recording paper and displayed on the display 16. If the MFP 1 is set in the facsimile mode, scanner mode, and copy mode, the image data generated by the scanning unit 20 is stored in a prescribed storage area of the RAM 13.

The printing unit 21 is an inkjet printer for printing images on a recording paper set at a prescribed feeding position (not shown) based on instructions from the CPU 11. The printing unit 21 includes a paper-conveying motor (not shown) for conveying the recording paper, a print head (not shown) for ejecting ink onto the recording paper, and a carriage motor (not shown) for moving a carriage (not shown) on which the print head is supported.

Based on commands from the CPU 11, the modem 22 modulates transmission data stored in the RAM 13 to produce an image signal that can be transmitted over a telephone network 100, and transmits the image signal to the telephone network 100 through the line controller 23. The modem 22 also receives an image signal from the telephone network 100 via the line controller 23 and demodulates the image signal into image data that can be displayed on the display 16 or printed on the printing unit 21. The line controller 23 is connected to the telephone network 100 and performs control processes to transmit a dial signal to the telephone network 100, respond to a call signal from the telephone network 100, and the like.

The transceiver 24 has a microphone and speaker for implementing a telephone call. Specifically, the microphone converts voice to a voice signal and outputs the voice signal, while the speaker converts an inputted voice signal to voice and outputs the voice. The transceiver 24 is electrically connected to the line controller 23 or the digital cordless communication controller 26 when an operation is performed to remove the transceiver 24 from the MFP 1 (an off hook operation). The transceiver 24 is disconnected from the line controller 23 or the digital cordless communication controller 26 when an operation is performed to return the transceiver 24 to the body of the MFP 1 (an on hook operation). The timing circuit 25 has an internal timer for keeping track of the current date and time and has a circuit well known in the art for calculating a prescribed time by comparing the date and time at which the timer was started to the current date and time.

The digital cordless communication controller 26 has a bit error rate detector 26a and a cordless antenna 27. When the transceiver 24 is taken off hook, the transceiver 24 is connected to the digital cordless communication controller 26, thereby wirelessly connecting the transceiver 24 to the handset 31. When the transceiver 24 transmits a voice signal to the digital cordless communication controller 26, the digital cordless communication controller 26 converts the voice signal to a digital signal for wireless communications and transmits the digital signal to the handset 31. Similarly, when the digital cordless communication controller 26 receives a digital signal for wireless communications from the handset 31, the digital cordless communication controller 26 converts the digital signal to a voice signal and transmits the voice signal to the transceiver 24. The bit error rate detector 26a detects bits in the digital signal received from the handset 31 that the digital cordless communication controller 26 could not properly receive and calculates a code error rate. If the bit error rate detector 26a detects a code error rate of 3% or greater, for example, in wireless communications between the MFP 1 and handset 31, it is assumed that interference has occurred during the wireless communication. A code error rate of less than 3% is considered an acceptable communication state.

The handset 31 includes primarily a CPU 32, a ROM 33, a RAM 34, a flash memory 35, a operating unit 36, a display 37, a transceiver 38, a digital cordless communication controller 39. These are connected each other via a bus line 40. The CPU 32 is a processor that executes various programs stored in the ROM 33, the RAM 34, and the flash memory 35 and various signal sent or received via the digital cordless communication controller 39. The CPU 11 controls the overall operation of the MFP 1 via the bus line 40.

The ROM 33 includes a control program area 33a that stores various control programs executed by the CPU 32. The ROM 33 is a memory that stores a program of a main process described later. The RAM 34 is a nonvolatile memory that temporarily stores various data and the like required in various processes executed by the CPU 32.

The operating unit 36 is used for managing the handset 31 and initiating a telephone call with the MFP 1 or an external device. The operating unit 36 is configured of an input device including numeric buttons and the like. The display 37 is configured of a liquid crystal display or other display device for displaying a telephone number inputted via the operating unit 36 and various data during the telephone call when managing the handset 31 or performing a telephone call with the MFP 1 or an external device.

The transceiver 38 has a microphone and speaker for implementing a telephone call. Specifically, the microphone converts voice to a voice signal and outputs the voice signal, while the speaker converts an inputted voice signal to voice and outputs the voice. The transceiver 38 is electrically connected to the digital cordless communication controller 39 when an operation is performed to remove the transceiver 38 from the handset 31 (an off hook operation). The transceiver 38 is disconnected from the digital cordless communication controller 39 when an operation is performed to return the transceiver 38 to the body of the handset 31 (an on hook operation). The speaker outputs input tones when operating the operating unit 36, a warning tone when an error occurs, and a ringtone indicating an incoming call.

The digital cordless communication controller 39 has a cordless antenna 41. When the transceiver 38 is taken off hook, the transceiver 38 is connected to the digital cordless communication controller 39, thereby wirelessly connecting the transceiver 38 to the MFP 1. When the transceiver 38 transmits a voice signal to the digital cordless communication controller 39, the digital cordless communication controller 39 converts the voice signal to a digital signal for wireless communications and transmits the digital signal to the MFP 1. Similarly, when the digital cordless communication controller 39 receives a digital signal for wireless communications from the MFP 1, the digital cordless communication controller 39 converts the digital signal to a voice signal and transmits the voice signal to the transceiver 38.

The access point 51 is a communication device well known in the art functioning as a relay device for connecting terminal devices connected wirelessly to the access point 51 to the LAN 200. A plurality of devices including the MFP 1, wireless LAN terminal A 61, and wireless LAN terminal B 62 can be simultaneously connected to the access point 51 and, hence, connected to the LAN 200.

Next, a method will be described for adequately maintaining a communication state according to a second communication method with the MFP 1 when the MFP 1 performs wireless communications according to a plurality of communication methods, even when there is interference with wireless communications performed according to another communication method. In this description, a communication method based on the wireless LAN standard will be referred to as a first communication method, while wireless communications based on the communication standard of the MFP 1 and the handset 31, which constitute the digital cordless telephone, will be referred to as the second communication method.

In the first communication method, when the MFP 1 and the access point 51 cannot perform wireless communication by interference, the MFP 1 repeats constructing the wireless communication. The same goes for the wireless communication between access point 51 and the wireless LAN terminals 61 and 62.

In the second communication method, the MFP 1 and handset 31 use one channel in a predetermined frequency band when the MFP 1 and handset 31 perform communications. When the MFP 1 and handset 31 cannot perform communications, the MFP 1 and handset 31 randomly switches the wireless channel to another wireless channel having a frequency band not currently used for wireless communications.

Figure 2B:
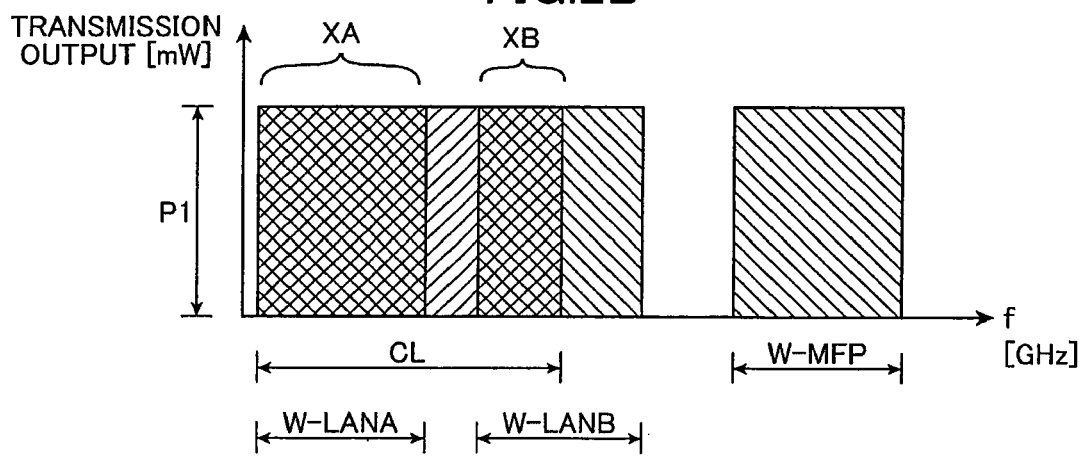
Figure 2C:
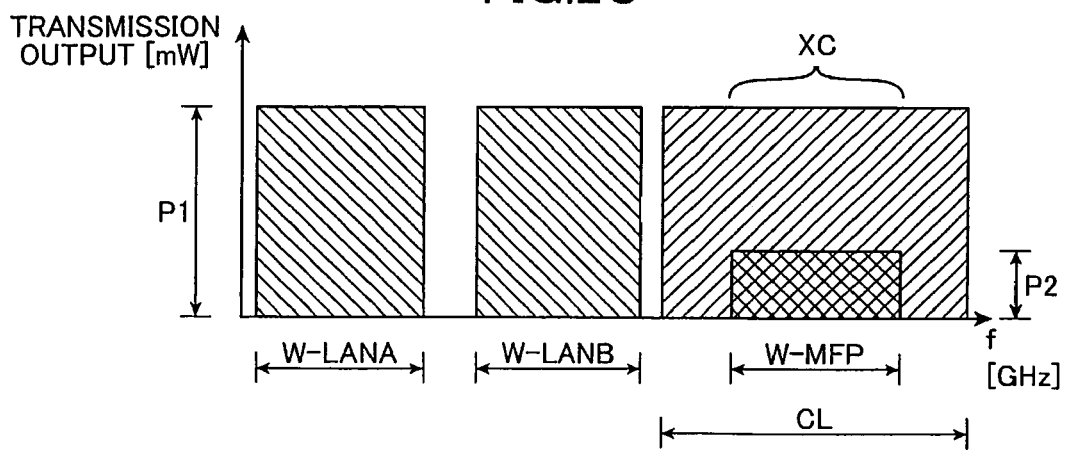

In FIG. 2, the vertical axis of each graph represents the output transmitted from each communication device, while the horizontal axis represents the frequency band from 2.4 to 2.5 GHz.

As shown in FIG. 2A, the MFP 1 and access point 51 occupy the frequency band W-MFP and transmit the output P1 (10 mW in the preferred embodiment) when performing data communications according to the first communication method. Further, the MFP 1 and handset 31 occupy the frequency band CL and transmit an output P1 when performing communications according to the second communication method. In this state, the MFP 1 and handset 31 and the MFP 1 and access point 51 can perform wireless communications without interference since the respective frequency bands do not overlap.

FIG. 2B shows the state in which the wireless LAN terminal A 61 and wireless LAN terminal B 62 (see FIG. 1) perform data communications with the access point 51 according to the first communication method, which data communications interfere with wireless communications between the MFP 1 and handset 31 in FIG. 2A. When performing data communications according to the first communication method, the wireless LAN terminal A 61 and access point 51 occupy the frequency band W-LANA and transmit the output P1, while similarly the wireless LAN terminal B 62 and access point 51 occupy the frequency band W-LANB and transmit the output P1.

The frequency band CL used for the second communication method and the frequency band W-LANA used for the first communication method overlap in the frequency region XA. The frequency region XA is the entire frequency band W-LANA that the wireless LAN terminal A 61 uses for communicating with the access point 51.

Similarly, the frequency band CL overlaps the frequency band W-LANB in the frequency region XB. The frequency region XB is a portion of the frequency band W-LANB that the wireless LAN terminal B 62 uses for communicating with the access point 51.

While the frequency band CL overlaps the frequency region XB, communications may still be performed adequately despite such interference, the interference having the effect of merely reducing the transfer rate. More specifically, since one channel of the frequency band CL is used in the second communication method, the access point 51 and wireless LAN terminal A 61 can perform communication by using the area of the frequency band W-LANB except for the channel.

However, when the frequency band for first communication method overlaps the frequency region XA, this interference prevents the wireless LAN terminal A 61 from communicating with the access point 51 properly. Specifically, the communication between the access point 51 and the wireless LAN terminal A 61 is more likely to use a channel that is used in the frequency band CL than communication between the access point 51 and wireless LAN terminal B 62, since the frequency region XA is the entire frequency band W-LANA.

Similarly, since the frequency bands W-LANA and W-LANB overlap nearly the entire frequency band CL that the MFP 1 uses to communicate with the handset 31 (frequency regions XA and XB), the MFP 1 and handset 31 cannot communicate properly due to the interference.

When this type of wireless communication interference occurs during data communications between the wireless LAN terminal A 61 and wireless LAN terminal B 62 and the access point 51, it is should halt data communications until the devices can communicate properly. It can be extremely inconvenient if a conversation is interrupted during a telephone call using the MFP 1 and handset 31 because of such wireless communication interference.

When proper wireless communications with the handset 31 cannot be achieved, the MFP 1 first determines whether a frequency band exists in which communications are possible with the second communication method. If such a frequency band is available, the MFP 1 uses that frequency band to perform a wireless telephone call with the handset 31. However, if there exists no frequency band for which communications with the second communication method is possible, then the frequency band CL used by the MFP 1 to communicate with the handset 31 is shifted to overlap the frequency band W-MFP used by the MFP 1 to communicate with the access point 51. Specifically, the center frequency of the frequency band CL is shifted to overlap the center frequency of the frequency band W-MFP. At this time, the frequency band W-MFP overlaps only a frequency region XC within the frequency band CL used by the MFP 1 to communicate with the handset 31.

Further, the frequency band W-MFP is not used when the MFP 1 and access point 51 are not exchanging data, even though the two are connected. Therefore, the MFP 1 and handset 31 can perform wireless communications using the frequency band CL. In addition, the wireless LAN communication controller 18 drops the transmission output from the MFP 1 to the access point 51 from P1 to P2 (3 mW in the preferred embodiment). By dropping the transmission output in the frequency band W-MFP to P2, the MFP 1 and handset 31 can execute wireless communications with a minimum of interference, even when the MFP 1 is performing wireless communications with the access point 51, thereby maintaining a satisfactory communication state between the MFP 1 and handset 31 to implement a telephone call. Further, while the transfer rate between the MFP 1 and access point 51 is dropped, data communications is still possible.

Next, a main communication process executed by the CPU 11 of the MFP 1 will be described with reference to FIG. 3. FIG. 3 is a flowchart illustrating steps in the main communication process of the MFP 1 and is repeatedly performed while the power to the MFP 1 is on.

In S1 at the beginning of the main process, the CPU 11 performs an initialization process for initializing the CPU 11 itself and the RAM 13, initializing various functions, and the like. In S2 the CPU 11 connects the MFP 1 to the access point 51 wirelessly in order to use the wireless LAN and initiates data communications with the access point 51 using the frequency band specified by the access point 51. In S3 the CPU 11 determines whether the user has inputted a connection request for connecting with the handset 31. The user inputs a connection request by taking the transceiver 24 of the MFP 1 off hook and pressing a button on the operating unit 15 for initiating a call with the handset 31. If the user has inputted such a connection request for the handset 31 (S3: YES), then in S4 the CPU 11 transmits a connection request from the MFP 1 to the handset 31. The connection request in S4 is a notification for connecting the handset 31 to the MFP 1 in order to begin communications between the MFP 1 and handset 31. However, if the user did not input a connection request for the handset 31 in S3 (S3: NO), then the CPU 11 skips to S5.

In S5 the CPU 11 determines whether a start communication request for the MFP 1 was received from the handset 31. If a start communication request for the MFP 1 was received from the handset 31 (S5: YES), then in S6 the CPU 11 initiates communications by setting the MFP 1 to use a frequency band available for communications with the handset 31, and in S7 instructs the handset 31 to perform communications using the same frequency band.

In S8 the CPU 11 begins the communication process. This process is performed primarily by the digital cordless communication controller 26. For example, the digital cordless communication controller 26 converts a voice signal transmitted from the transceiver 24 to a digital signal for wireless communications and transmits this digital signal to the handset 31, and converts a digital signal received from the handset 31 to a voice signal and transmits the voice signal to the transceiver 24. In addition, the bit error rate detector 26a detects whether the digital signal transmitted from the handset 31 could be received properly by the digital cordless communication controller 26 by calculating the code error rate. However, if the CPU 11 determines in S5 that a start communication request for the MFP 1 was not received from the handset 31 (S5: NO), then the CPU 11 returns to S3.

In S9 the CPU 11 determines whether the code error rate in communications with the handset 31 is 3% or greater. If the code error rate is 3% or greater (S9: YES), then in S10 the CPU 11 performs a communication setting process. If the code error rate is less than 3% (S9: NO), then the CPU 11 advances to S11. The communication setting process will be described later in detail with reference to FIG. 4.

In S11 the CPU 11 determines whether communications with the handset 31 have ended. The CPU 11 advances to S12 if communications with the handset 31 have ended (S11: YES), and returns to S9 if communications have not ended (S11: NO).

In S12 the CPU 11 determines whether a frequency band overlapping that of the wireless LAN was used for communications with the handset 31. If the frequency band used for communications with the handset 31 overlapped that of the wireless LAN (S12: YES), then in S13 the CPU 11 returns the transmission output for the wireless LAN to its normal value and returns to S3. However, if a frequency band overlapping that of the wireless LAN was not used for communications with the 31 (S12: NO), then the CPU 11 simply returns to S3. Hence, the process in FIG. 3 functions to determine whether wireless communications between the MFP 1 and handset 31 have interference from another communication device and executes the communication setting process described later to prevent such interference.

Next, the communication setting process executed by the CPU 11 of the MFP 1 will be described with reference to FIG. 4. FIG. 4 is a flowchart illustrating steps in the communication setting process. In S21 at the beginning of this process, the CPU 11 determines whether there exists a frequency band available for communications with the handset 31. If such a frequency band is available (S21: YES), then in S22 the CPU 11 configures the MFP 1 to use this available frequency band.

In S23 the CPU 11 issues a command to the handset 31 to perform communications using the same frequency band, and subsequently ends the process.

However, if a frequency band is not available for communications with the handset 31 (S21: NO), then in S24 the CPU 11 determines whether a frequency band overlapping that of the wireless LAN in the MFP 1 is being used for communications with the handset 31. If a frequency band overlapping that of the wireless LAN is not being used for communications with the handset 31 (S24: NO), then in S25 the CPU 11 sets the MFP 1 for using a frequency band overlapping that of the wireless LAN for communications with the handset 31. Specifically, in the S25, the CPU 11 sets a frequency band for communications with the handset 31, so as to overlap the frequency band that of the wireless LAN. More specifically, the CPU 11 sets a frequency band for communications with the handset 31, so as to overlap the center frequency of the frequency band that of the wireless LAN. In S26 the CPU 11 issues a command to the handset 31 to perform communications using the same frequency band overlapping the wireless LAN, and subsequently ends the process.

However, if the frequency band overlapping that of the wireless LAN in the MFP 1 is being used (S24: YES), then in S27 the CPU 11 determines whether the transmission output for the wireless LAN can be decreased. Specifically, the CPU 11 determines whether the transmission output of the wireless LAN can be decreased to a predetermined lower limit by detecting transmission output during wireless communications with the wireless LAN. It is also possible to decrease the transmission output by steps of a prescribed interval. If the CPU 11 determines that the transmission output of the wireless LAN in the MFP 1 can be decreased (S27: YES), then in S28 the CPU 11 decreases the transmission output of the wireless LAN. However, if the transmission output cannot be decreased (S27: NO), then the CPU 11 ends the process. Hence, when interference with another communication device affects wireless communications between the MFP 1 and handset 31, the process in FIG. 4 functions to change the interference received from the other communication device to interference received from wireless communications performed by the wireless LAN communication controller 18, by shifting the frequency band used for wireless communications between the MFP 1 and handset 31 to overlap the frequency band used for wireless communications between the MFP 1 and access point 51. Hence, by shifting the frequency band used for communications with the handset 31 and by controlling the wireless LAN communication controller 18 and digital cordless communication controller 26 in the MFP 1, the CPU 11 can avoid interference with communications between the MFP 1 and handset 31. The MFP 1 can further prevent interference in communications with the handset 31 by controlling the wireless LAN communication controller 18 to reduce the output of data transmitted to the access point 51.

Figure 5:
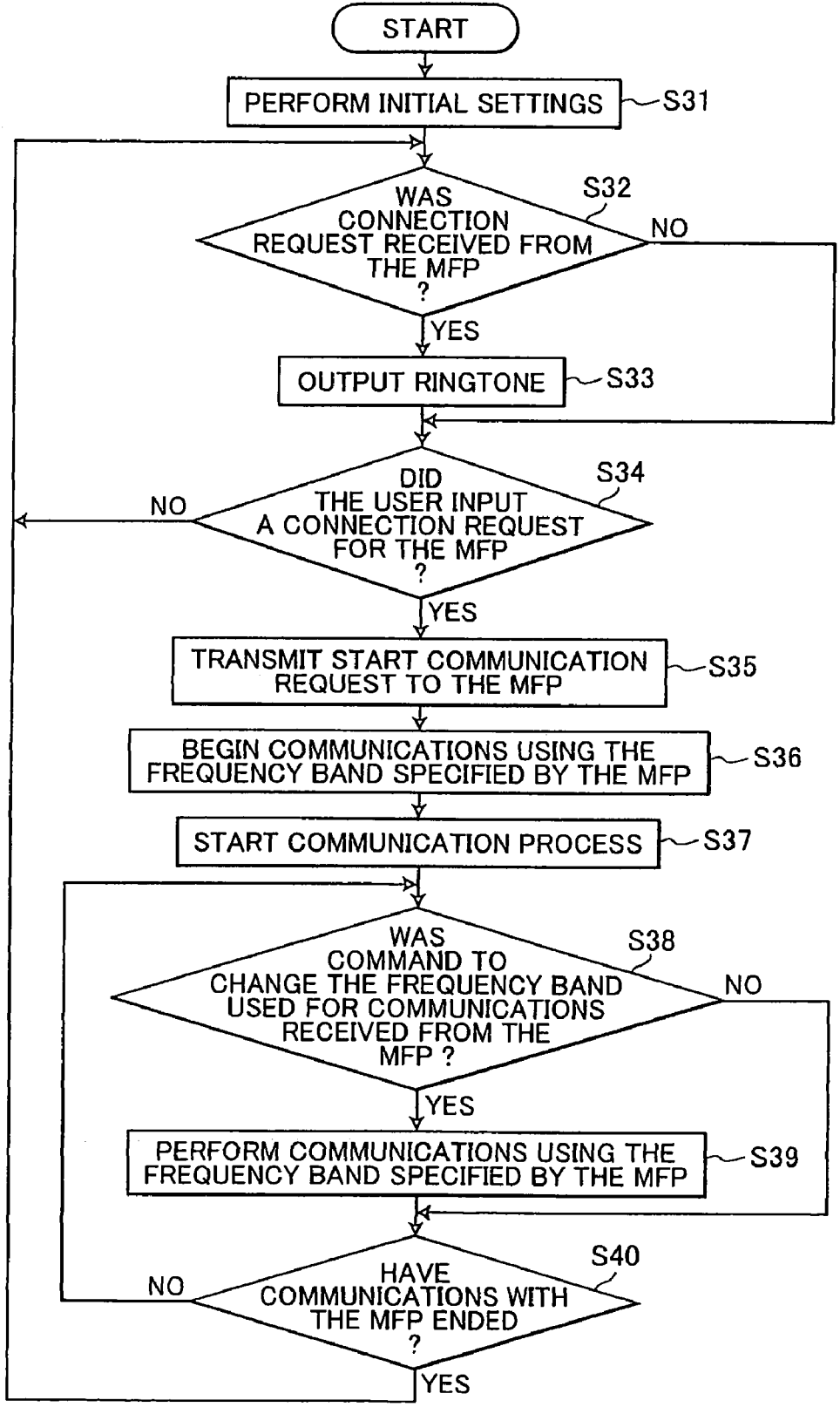
FIG. 5 is a flowchart illustrating steps in a main communication process performed by the handset.

Next, the main communication process executed by the CPU 32 of the handset 31 will be described with reference to FIG. 5. FIG. 5 is a flowchart illustrating steps in the main communication process of the handset 31 and is repeatedly executed while the power to the handset 31 is on. In S31 at the beginning of the main process, the CPU 32 performs an initialization process for initializing the CPU 32 itself and the RAM 34, for initializing various functions, and the like.

In S32 the CPU 32 determines whether the handset 31 has received a connection request from the MFP 1. If a connection request has been received from the MFP 1 (S32: YES), then in S33 the CPU 32 outputs a ringtone from the speaker of the transceiver 38. However, if no connection request has been received from the MFP 1 (S32: NO), then the CPU 32 skips to S34. In S34 the CPU 32 determines whether the user has inputted a connection request for the MFP 1. The user inputs this connection request by putting the handset 31 in the off hook state and pressing a button on the operating unit 36 to initiate a call with the MFP 1.

If the user has inputted a connection request for the MFP 1 (S34: YES), then in S35 the CPU 32 transmits a communication start request to the MFP 1. When this request is transmitted, the MFP 1 transmits a command to the handset 31 for performing communications. Hence, in S36 the CPU 32 begins a telephone call with the MFP 1 using the frequency band specified by the MFP 1, and in S37 begins the communication process. This communication process is primarily handled by the digital cordless communication controller 39. For example, the digital cordless communication controller 39 converts a voice signal transmitted from the transceiver 38 to a digital signal for wireless communications and transmits this digital signal to the MFP 1, and converts a digital signal received from the MFP 1 to a voice signal and transmits this voice signal to the transceiver 38. However, if the user did not input a connection request for the MFP 1 (S34: NO), the CPU 32 returns to S32.

In S38 the CPU 32 determines whether the MFP 1 has issued an instruction to the handset 31 for changing the frequency band used for communications. If the MFP 1 has issued such a command to the handset 31 (S38: YES), then in S39 the CPU 32 performs communications using the frequency band specified by the MFP 1. However, if such an instruction has not been received from the MFP 1 (S38: NO), then the CPU 32 advances to S40.

In S40 the CPU 32 determines whether communications with the MFP 1 have ended, returning to S32 if communications with the MFP 1 have ended (S40: YES) and returning to S38 if communications with the MFP 1 have not ended (S40: NO). By using the frequency band specified by the MFP 1 in the process of FIG. 5, the handset 31 can maintain an adequate wireless communication state with the MFP 1, serving as the base unit, even when incurring interference from another communication device.

With the preferred embodiment described above, when another communication device interferes with wireless communications between the MFP 1 and handset 31, the MFP 1 changes this interference from the other communication device to interference received from wireless communications with the wireless LAN communication controller 18 by shifting the frequency band used for wireless communications with the handset 31 to a frequency band used in wireless communications with the access point 51. The MFP 1 can prevent wireless communications with the wireless LAN communication controller 18 from interfering with communications with the handset 31 by controlling the wireless LAN communication controller 18. The MFP 1 can further reduce interference on wireless communications with the handset 31 by controlling the wireless LAN communication controller 18 to reduce transmission output to the access point 51, thereby maintaining a suitable wireless communication state between the MFP 1 and handset 31.

Although the present invention has been described with respect to specific embodiments, it will be appreciated by one skilled in the art that a variety of changes may be made without departing from the scope of the invention.

For example, in the preferred embodiment described above, when frequency bands used for wireless communications with the wireless LAN of the MFP 1 and wireless communications between the MFP 1 and handset 31 overlap, the wireless LAN communication controller 18 reduces the transmission output for the frequency band W-MFP from P1 to P2 in order to minimize the effects of interference on wireless communications between the MFP 1 and handset 31. However, it is not necessary to reduce the transmission output of the frequency band W-MFP if the transmissions do not affect the call between the MFP 1 and handset 31.

Further, the wireless LAN communication controller 18 can raise the transmission output from the MFP 1 to the handset 31. By the raising the transmission output in the frequency band CL, the MFP 1 and handset 31 can execute wireless communications with a minimum of interference, even when the MFP 1 is performing wireless communications with the access point 51, thereby maintaining a satisfactory communication state between the MFP 1 and handset 31 to implement a telephone call.

Further, in the preferred embodiment described above, the MFP 1 shifts the frequency band used for wireless communications with the handset 31 to overlap the frequency band used by the wireless LAN of the MFP 1 based on the code error rate detected by the bit error rate detector 26a. However, the MFP 1 may be provided with an operating key for selecting whether or not to shift the frequency band to overlap the frequency band used by the wireless LAN and may perform this shift by a user operation through the operating key. Similarly, the MFP 1 may be provided with an operating key for selecting whether to reduce the transmission output of the wireless LAN in the MFP 1 and the MFP 1 may perform this reduction based on a user operation through the operating key.

Further, in the preferred embodiment described above, the MFP 1 shifts the frequency band used for wireless communications with the handset 31 to overlap the frequency band used by the wireless LAN of the MFP 1 based on the code error rate detected by the bit error rate detector 26a. However, the handset 31 may be provided with an operating key for selecting whether or not to shift the frequency band to overlap the frequency band used by the wireless LAN and may perform this shift by a user operation through the operating key. Similarly, the handset 31 may be provided with an operating key for selecting whether to reduce the transmission output of the wireless LAN in the MFP 1 and may perform this reduction based on a user operation through the operating key. Since handsets in digital cordless telephones are frequently designed to be small and easy to carry, providing the above operating keys on the handset enables the user to select whether or not to shift the frequency band and reduce the transmission output from a remote location relative to the base unit, without having to return to the base unit to perform such settings.

What is claimed is:

1. A communication device communicating with a first communication device and a second communication device, the communication device comprising:
    a first communicating unit capable of communicating wirelessly with the first communication device according to a first communication method;
    a second communicating unit capable of communicating wirelessly with the second communication device according to a second communication method different from the first communication method;
    a first frequency setting unit setting a first frequency band used for wireless communications by the first communicating unit, the first frequency band providing a first center frequency;
    a second frequency setting unit setting a second frequency band used for wireless communications by the second communicating unit, the second frequency band providing a second center frequency;
    a selector selecting whether to shift the second frequency band; and
    a control unit controlling the second frequency setting unit to set the second frequency band so as to provide overlapping of the first center frequency with the second center frequency when the selector selects to shift the second frequency band,
    wherein when the second frequency setting unit sets the second frequency band so as to provide overlapping of the first center frequency with the second center frequency, the first communicating unit communicates with the first communication device according to the first communication method by using the first frequency band and the second communicating unit communicates with the second communication device according to the second communication method by using the second frequency band whose center frequency is overlapped with the first center frequency.

2. The communication device according to claim 1, wherein the control unit controls the second frequency setting unit to set the second frequency band so as to overlap the first frequency band set by the first frequency setting unit.

3. The communication device according to claim 1, further comprising:
    a first output-setting unit setting a first transmission output used for wireless communications by the first communication method;
    a second output-setting unit setting a second transmission output used for wireless communications by the first communication method; and
    a first output control unit controlling the first output-setting unit to set the first transmission output lower than the second transmission output when the selector selects to shift the second frequency band.

4. The communication device according to claim 1, further comprising:
    a first output-setting unit setting a first transmission output used for wireless communications by the first communication method;
    a second output-setting unit setting a second transmission output used for wireless communications by the first communication method; and
    a second output control unit controlling the second output-setting unit to set the second transmission output higher than the first transmission output when the selector selects to shift the second frequency band.

5. The communication device according to claim 1, further comprising a detecting unit that detects a code error from a data received by the second communication method and calculates a code error rate;
    wherein the selector selects to shift the second frequency band when the detector detects the code error rate of greater than a predetermined rate.

6. The communication device according to claim 5, further comprising:
    a first output-setting unit setting a first transmission output used for wireless communications by the first communication method;
    a second output-setting unit setting a second transmission output used for wireless communications by the first communication method; and
    a first output control unit controlling the first output-setting unit to set the first transmission output to a third transmission output that has the code error rate smaller than the predetermined rate when the selector selects to shift the second frequency band.

7. The communication device according to claim 5, wherein the controlling unit controls the second setting unit to set the second frequency band to a third frequency band that has the code error rate smaller than the predetermined rate when the first center frequency and the second center frequency overlap.

8. The communication device according to claim 1, wherein the first communication method is a data communication method, and the second communication method is a voice communication method.

9. The communication device according to claim 1, wherein the first communicating unit communicates with an access point as the first communication device, and the second communicating unit communicates with a handset of a digital cordless telephone as the second communication device.

10. The communication device according to claim 1, wherein the first communicating unit constantly uses an entire frequency band of the first frequency band set by the first setting unit, and the second communicating unit uses a temporary region in the second frequency band set by the second setting unit, the temporary region being shiftable in the second frequency band.

* * * * *